Patented Aug. 14, 1945

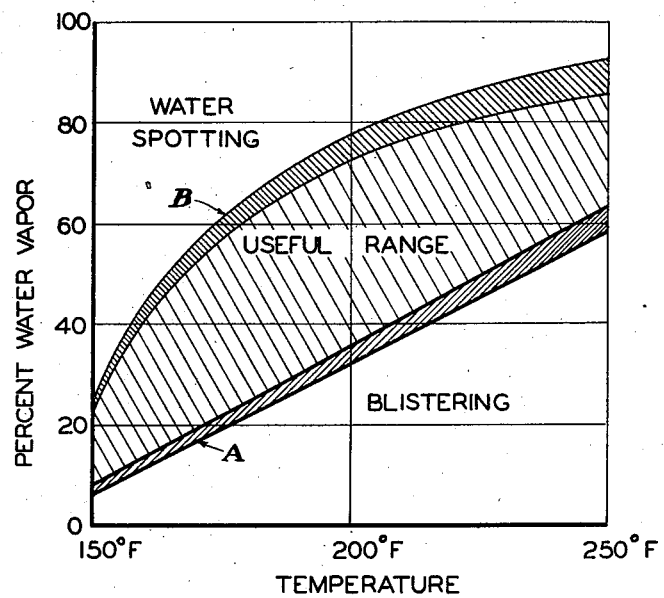

2,381,944

UNITED STATES PATENT OFFICE 2,381,944

WOOD FINISHING SYSTEM

Melville M. Wilson and William E. Berry, Cincinnati, Ohio, assignors to Interchemical Corporation, New York, N. Y., a corporation of Ohio Application May 15, 1941, Serial No. 393,556

2 Claims. (Cl. 117—103)

This invention relates to the art of preparing smooth, hard, resinous finishes on porous surfaces, and it is particularly directed to a method of baking finishes containing heat-hardenable resins on wood.

The conventional method of protecting wood surfaces and to bring out their inherent beauty is to apply a "sealing" coat (after the wood surface has been prepared by sanding, staining and filling operations) which consists of a quick-drying varnish or lacquer, usually containing a transparent pigment to facilitate sanding. This sealing coat constitutes the first film or protective coating which extends continuously over the wood surface. The coat is sanded and the finishing varnish or lacquer is then applied in one or more coats. Since a glossy finish is seldom used on furniture and other similar wooden objects, the finishing coat is either pigmented with a transparent pigment, such as infusorial earth or a metallic soap, to give it a flat or dull surface or it is dried for a sufficient length of time to permit rubbing with pumice stone and oil to the desired satin-like appearance.

Because of the necessity for applying a large number of coats and the desire to obtain rapid finishing schedules even the best of the conventional wood finishes are unusually "short" and readily susceptible to scratching and abrasion. Furthermore, unless expensive materials are used, the finishes are easily damaged by alcohol and water. The "shortness" of the finishes also introduces the hazards of checking and crazing after the articles bearing the finish have been in use for some time.

In order to overcome these objections to the conventional air-dried finishes it has been suggested that this type of finish be replaced by condensation products of the phenol-aldehyde type with or without the addition of urea resins. (See the Maisch U. S. Patent No. 2,228,837, issued January 14, 1941.) These materials are all of the type which can be heat-hardened at relatively low temperatures or which can be hardened at ordinary temperatures by means of acid catalysts. Since hardening at ordinary temperatures requires a considerable length of time it is necessary, from a practical standpoint, to harden the finishes by baking. However, the principal drawback to baking these finishes has been the so-called "bubbling" or "blistering" phenomenon. This is the formation of small blisters in the finish during the baking operation with the result that, when these finishes are used at all, the practice has been to use a compromise finish consisting of an air-dried sealing coat and a top coat which can be hardened at temperatures below about 150° F. While the combination of air-dried sealing coat and heat-hardened top coat gives a finish which is resistant to alcohol, water and many other liquids, it still lacks toughness and is almost as short as the conventional air-dried finishes.

This invention provides a method of baking, on porous surfaces such as wood, finishes containing one or more thermosetting resins in which baking temperatures higher than those heretofore used (e. g. above about 150° F.) and longer baking periods can be employed without obtaining bubbling or blistering of the finish. Likewise, sealing coats which are heat-hardenable (as distinct from the air-drying type) may be used with the result that a firm bond with the thermosetting resinous top coat is obtained. Also it is not necessary to sacrifice toughness, "length" of film and other wearing qualities for "quick-drying" properties because slower setting resins, including those which are known for their toughness and resistance to abrasion, may be successfully baked to produce finishes which will retain their original appearance for a longer time and under greater abuse than has been the case with finishes known heretofore.

The invention also includes articles having naturally porous surfaces bearing finishes which have been heat-hardened according to this method and which are characterized by their toughness, firm adherence to the porous surface, resistance to abrasion, wear, action of water and alcohols, and freedom from bubbles or blisters.

It has been found that damage to the finish, which occurs during the baking operation and which is appreciable at temperatures above about 150° F., may be obviated by adding water vapor to the oven atmosphere and maintaining a relatively high humidity during the baking operation. The amount of water vapor which is maintained in the oven atmosphere is not critical, but two conditions should be avoided: (1) Letting the humidity rise to the point where moisture condenses or falls on the resin finish, and (2) not maintaining sufficient humidity or permitting the humidity to drop suddenly to the point where blistering of the finish sets in. The reason for avoiding contact of the finish with condensed moisture is that usually water will mark the hot finish before it has become fully hardened. Of course, if this is not important or if the particular finish being employed is resistant to water marking during all stages of hardening the humidity may be maintained as high as is desired.

For a given temperature an increase in the water vapor concentration at first appreciably increases the permissible baking time, but beyond a certain point additional increases in water vapor concentration do not increase the permissible baking time (or immunity of the coating from blistering) to the same extent. Therefore, there is an approximate range of water vapor concentration for any given temperature which is the most practical from the economic and engineering viewpoint. The upper limit of the range, for a given temperature, depends entirely on economic and engineering factors in the design of the baking oven. We have found that, generally, the relative humidity should be kept appreciably below saturation at temperatures up to 212° F., and at temperatures above 212° F. the water vapor concentration should be kept appreciably below 100% (e. g. 80% to 90%), for the reason that it is difficult to design baking ovens which are of uniform temperature throughout, so that condensation of moisture on the cooler parts (with consequent contact of the water with the finish being baked) is likely to occur at relatively high concentrations of water vapor. Also care must be exercised in introducing a coated article into the baking oven to see that the article is not appreciably below the dew point of the oven atmosphere, if condensation of water on the finish is to be avoided. In actual practice this condensation has to be severe to cause harm to the finish, because the water quickly re-evaporates while warming up before the finish hardens.

On the other hand, the lower limit of water vapor concentration in the oven atmosphere is directly related to the successful baking of the heat-hardenable finishes at temperatures in excess of about 150° F., and it depends, first, on the oven temperature (i. e. "baking" temperature), and, second, on the length of time the particular resinous finish must be exposed to the oven temperature, or heated, to obtain a coating of satisfactory hardness. We have found that for the usual types of thermosetting resinous finishes which can be hardened satisfactorily at temperatures from about 150° F. to about 250° F. in baking periods which are short enough to be commercially practicable, the lower limit of water vapor concentration is about 7% by volume at 150° F. and it increases with temperature until, at about 200° F. it is about 35%, and at 250° F. the lower limit should be about 60%. Since different finishes require different baking schedules the above percentages for the lower limit may be varied somewhat. Generally, however, it is not desirable to use water vapor concentrations materially lower than those indicated.

In the accompanying drawing curve A indicates the approximate minimum water vapor concentration in the oven atmosphere for a range of temperatures from about 150° F. to about 250° F., and it provides a working index for the successful practice of this invention from the engineering or commercial standpoint. The upper curve B indicates the approximate maximum water vapor concentration which can be used in practice in the baking of finishes which are sensitive to hot water before they are completely hardened.

Although the described method of baking finishes in a humid atmosphere is applicable to the heat-hardening of all thermosetting finishes on porous surfaces, the following procedure illustrates a typical application of the process to the finishing of a wood surface with a special type of carbamide-alkyd resin coating composition.

The wood surface to be finished was sanded and stained in the customary way. Then a "wash coat" or stiffening solution consisting of a thin dispersion of a fast-setting urea-formaldehyde alkyd resin was applied and allowed to dry. The composition of this resin is described further on in connection with the sealing coat. After drying the wood was sanded again to remove the fiber ends or "whiskers" raised by the wash coat to give a truly smooth surface.

The pores of the wood were next filled by applying to the wood a dispersion of a fatty acid modified alkyd resin and pigment in a solvent, evaporating the solvent and rubbing off the excess filler, followed by a short baking period (45 minutes at 150° F.) to harden the filler retained in the pores of the wood. It is not necessary to maintain a humid oven during baking of the filler, in this example, because the filler cannot bubble as it does not exist as a continuous film over the surface of the wood.

After hardening of the filler the wood was ready for application of the finishing coats of protective, continuous films. The first protective coat is usually called the "sealing coat" as it extends continuously over the wood and seals the surface. The sealing coat employed in this example consisted essentially of equal parts by weight of a hydrocarbon-soluble urea-formaldehyde resin and an alkyd resin modified with linseed oil fatty acids and China wood oil, and a flatting agent, dispersed in butanol containing some aromatic hydrocarbons and octyl alcohol. A small amount of monobutyl phosphate was added, along with cobalt naphthenate drier, to obtain more rapid hardening of the sealing coat during baking. The flatting agent was added to facilitate sanding and it can be any of the usual materials, such as infusorial earth, calcium and aluminum stearates and the like.

The sealing coat was sprayed (or otherwise applied) to the filled wood until a uniform film had been deposited. After a preliminary air-drying period to remove most of the volatile solvent the film was baked for 45 minutes at a temperature of 150° F. in an atmosphere containing about 11% water vapor (relative humidity of about 45%).

Ordinarily it is necessary to underbake the sealing coat if additional coats are to be applied over it for the reason that a second coat will not bond well to a completely heat-hardened undercoat, and that is why the sealing coat in this example was baked only 45 minutes instead of a full hour which is necessary for complete heat-hardening. However, the baked coat seemed to be completely hardened with respect to its feel or appearance.

It is of prime importance that the sealing coat be baked in a humid atmosphere in accordance with this invention to avoid blistering or bubbling if temperatures as high as 150° F. are used. However, once the sealing coat has been baked all subsequent coatings may be baked without regard to the humidity of the oven provided the subsequent baking temperatures do not exceed that at which the sealing coat was baked. In the event that higher baking temperatures for final coats are desired the final coat must be baked in a humid atmosphere in the same way as would be done if it were a sealing coat. In the particular example described the baked sealing coat was lightly sanded and a second coat of the urea-alkyd resin dispersion was applied, with the flatting agent omitted because a bright finish was desired. The second coat was dried and baked in the same way as the sealing coat.

Other test panels prepared in the manner described in the above example were baked at higher temperatures under higher humidities and for shorter baking times with equally successful results. In fact, the finishes which were baked at temperatures in excess of about 200° F. were slightly harder. The following table indicates the approximate conditions which were employed in baking the final coats at higher temperatures.

| Temperature | Humidity | Baking time |
|---|---|---|
| 150° F | 11% (by volume) water vapor. | 1 hour. |
| 175° F | 3% | 45 minutes. |
| 200° F | 50% | 30 minutes. |
| 250° F | 75% | 15 minutes. |

Besides the urea-alkyd resin finish described we have used other heat-hardening resinous finishes, such as drying oil-modified alkyd resins, heat advancing phenol-formaldehyde resins and other conventional resinous baking finishes. In each case the process of humid baking according to this invention permitted increased baking temperatures and resultant shortened baking schedules. Also, the finishes have been applied successfully to natural and artificial porous surfaces other than wood, such as artificial fiber board and the like.

We claim:

1. A process of finishing wood to produce a hard, tough, smooth surface, free of blistering or bubbling, with a resinous coating, which is polymerizable by heat of the order of 150–250° F. to a hard film, which comprises applying the resinous coating to the wood, and heating the coated wood for a sufficient time to harden the coating, to a temperature in the range of from 150 to 250° F., in which range of temperature blistering and bubbling is ordinarily encountered, the heating being conducted in an atmosphere which prevents blistering and bubbling by reason of its high water vapor concentration, which is within the area bounded by a lower line which passes through about 7% by volume of water vapor at 150° F., about 35% at 200° F., and about 60% at 250° F., and by a higher line which passes through about 22% at 150° F., about 60% at 175° F., about 75% at 200° F., and about 85% at 250° F.

2. A process of finishing wood to produce a hard, tough, smooth surface, free of blistering or bubbling, with a resinous coating, comprising a mixture of urea resin and alkyd resin, which comprises applying the resinous coating to the wood, and heating the coated wood for a sufficient time to harden the coating, to a temperature in the range of from 150 to 250° F., in which range of temperature blistering and bubbling is ordinarily encountered, the heating being conducted in an atmosphere which prevents blistering and bubbling by reason of its high water vapor concentration, which is within the area bounded by a lower line which passes through about 7% by volume of water vapor at 150° F., about 35% at 200° F., and about 60% at 250° F., and by a higher line which passes through about 22% at 150° F., about 60% at 175° F., about 75% at 200° F., and about 85% at 250° F.

MELVILLE M. WILSON.
WILLIAM E. BERRY.